3,069,392
ACTIVATORS FOR THE POLYMERIZATION OF PYRROLIDONE
Howard G. Clark and William B. Black, Decatur, Ala., assignors, by mesne assignments, to Monsanto Chemical Company, a corporation of Delaware
No Drawing. Filed Apr. 21, 1958, Ser. No. 729,500
21 Claims. (Cl. 260—78)

This invention relates to a new process for polymerizing 2-pyrrolidone. More particularly, the invention is concerned with a new polymerization procedure for the manufacture of pyrrolidone polymers wherein there are employed new catalyst-activator systems.

Pyrrolidone is normally polymerized in the presence of a polymerization catalyst, such as the alkali metals and various organic metallic compounds, as well as sodium amide, calcium oxides and hydroxides, etc. It has been found that the activity of said catalysts during the polymerization reaction can be enhanced by the addition thereto of various compounds which are classed as catalyst or polymerization activators. For example, among the compounds heretofore proposed as catalyst or polymerization activators there may be named the acyl compounds, such as acetyl pyrrolidone, acetyl morpholone, and the like; lactones, such as gamma-butyrolactone, and the like; alkyl esters of mono- and dicarboxylic acids, such as ethyl acetate, ethyl oxalate, and the like; and the esters of polyhydric alcohols, such as ethylene glycol diacetate, etc. However, the presently known catalyst-activator systems for the polymerization of 2-pyrrolidone leave much to be desired.

Many of the compounds heretofore proposed as catalyst or polymerization activators for 2-pyrrolidone polymerization are difficult to handle, which obviously makes them undesirable from a commercial standpoint. Further, many of the prior art compounds proposed as activators tend to oxidize the polymers as they are formed resulting in undesirable changes in color and in detrimental changes in physical properties of the polymers, such as reduced solubility. In addition, many of said compounds introduce end groups into the polymer chain which deleteriously effect the solubility of the polymer and decrease the dye receptivity of the polymer. Accordingly, there has been a need in the art for a catalyst-activator system which overcomes the above disadvantages and which is easily and readily adaptable to a commercial operation.

Accordingly, it is a principal object of the present invention to provide new catalyst-activator systems for the polymerization of 2-pyrrolidone. It is another object of the invention to provide new catalyst-activator systems for the polymerization of 2-pyrrolidone which result in the formation of polymers having desirable and improved physical properties, such as good solubility, excellent color and high molecular weight. It is a further object of the invention to provide a new process for preparing pyrrolidone polymers. Other objects and advantages of the invention will be apparent from reading the description thereof hereinafter.

In general, the objects of the present invention are accomplished by polymerizing 2-pyrrolidone under polymerization conditions in the presence of a polymerization catalyst and a catalyst or polymerization activator selected from the group consisting of nitrogen dioxide and certain organic nitrites. The organic nitrites contemplated in the practice of the present invention are those having the general formula:

R—O—N=O wherein R is selected from the group consisting of alkyl groups containing 1 to 10 carbon atoms, halo-alkyl groups containing 2 to 10 carbon atoms, nitroalkyl groups containing 2 to 10 carbon atoms, aralkyl groups containing 7 to 10 carbon atoms, and alkoxy alkyl groups containing 3 to 12 carbon atoms. As examples of such compounds there may be named methyl nitrite, ethyl nitrite, n-propyl nitrite, iso-propyl nitrite, n-butyl nitrite, iso-butyl nitrite, amyl nitrite, iso-amyl nitrite, hexyl nitrite, heptyl nitrite, octyl nitrite, nonyl nitrite, decyl nitrite, and their isomeric forms and the like; haloalkyl nitrites such as 2,2,2-trichloroethyl nitrite; the dihaloalkyl nitrites such as 2,2-dichloroethyl nitrite, 2,2-dichloropropyl nitrite, 2,2-dichlorobutyl nitrite, 2,2-dichloroamyl nitrite, 2,2-dichlorohexyl nitrite, 2,2-dichloroheptyl nitrite, 2,2-dichlorooctyl nitrite, 2,2-dichlorononyl nitrite, 2,2-dichlorodecyl nitrite and the like monochloroalkyl nitrites, their isomeric forms and the like; nitroalkyl nitrites, such as 2-nitroethyl nitrite, 2-nitropropyl nitrite, 2-nitrobutyl nitrite, 2-nitroamyl nitrite, 2-nitrohexyl nitrite, 2-nitroheptyl nitrite, 2-nitrooctyl nitrite, 2-nitrononyl nitrite, 2-nitrodecyl nitrite, and their isomeric forms and the like; aralkyl nitrites such as benzyl nitrite, 2-methylbenzyl nitrite, 3-methylbenzyl nitrite, 4-methylbenzyl nitrite, 2-ethylbenzyl nitrite, 3-ethylbenzyl nitrite, 4-ethylbenzyl nitrite, 2-propylbenzyl nitrite, 3-propylbenzyl nitrite, 4-propylbenzyl nitrite, 2-methyl-3-ethylbenzyl nitrite, 2-methyl-4-ethylbenzyl nitrite, 2-methyl-5-ethylbenzyl nitrite, 2-methyl-6-ethylbenzyl nitrite, 3-methyl-4-ethylbenzyl nitrite, 3-methyl-5-ethylbenzyl nitrite, 3-methyl-6-ethylbenzyl nitrite, 4-methyl-2-ethylbenzyl nitrite, 4-methyl-3-ethylbenzyl nitrite, 2,3-dimethylbenzyl nitrite, 2,4-dimethylbenzyl nitrite, 2,5-dimethylbenzyl nitrite, 2,6-dimethylbenzyl nitrite, 3,4-dimethylbenzyl nitrite, 3,5-dimethylbenzyl nitrite and the like; and alkoxyalkyl nitrites such as 2-methoxy-ethyl nitrite, 2-ethoxyethyl nitrite, 2-propoxyethyl nitrite, 2-butoxyethyl nitrite, 2-pentoxyethyl nitrite, 2-hexoxyethyl nitrite, 2-heptoxyethyl nitrite, 2-octoxyethyl nitrite, 2-nonoxyethyl nitrite, 2-decoxyethyl nitrite, and their isomeric forms and the like.

In the instant invention, the nitrogen dioxide or organic nitrite may be utilized with any of the known catalysts normally employed in the polymerization of 2-pyrrolidone. The molar ratio of catalyst to monomeric pyrrolidone in the reaction mixture may be varied from 1:5 to 1:280. The molar ratio of activator to catalyst may be varied from 1:1.1 to 1:200. That is to say, one mole of activator may be reacted with from 1.1 to 200 moles of catalyst but there should always be a slight excess of catalyst present. Then again, when the moles of catalyst in the reaction mixture are increased, there should be a corresponding increase in moles of monomer so that there are at least 5 moles of monomer present for each mole of catalyst. For example, when employing 200 moles of catalyst and 1 mole of activator, there must be at least 1000 moles of monomer present in the reaction mixture.

As previously mentioned, any known catalyst for polymerizing 2-pyrrolidone may be employed in the practice of the present invention, such as the alkali metals, namely, sodium, potassium and lithium; the hydrides, hydroxides, oxides and salts of the alkali metals, that is, such salts as sodium, potassium and lithium pyrrolidone; organic metallic compounds, preferably those which are strongly basic, for example the lithium, potassium and sodium alkyls and the aryls of the alkali metals, such as sodium phenyl and the like; sodium amide, and other catalysts.

The polymerization reaction of this invention is carried out at temperatures within a range of −70° C. to 100° C. In the preferred practice of the invention the polymerization reaction is carried out at a temperature in the range of 20° C. to 70° C., particularly when it is desired to produce polymers having fiber-forming properties.

The reaction time will vary with the temperature and the amount of monomer employed. Where higher temperatures are used in the polymerization reaction, the total time required to complete polymerization is shorter. The polymerization period is also greatly affected by the particular catalyst-activator system employed.

While it is not positively known exactly what takes place when 2-pyrrolidone is polymerized in accordance with the present invention, it is believed that the polymerization of 2-pyrrolidone is accomplished by first forming ionic pyrrolidone salts. For example, when one employs sodium hydroxide as a catalyst, a reversible reaction takes place between the monomeric 2-pyrrolidone molecules and the hydroxide ion with the subsequent formation of water. Since this reaction is reversible, it is necessary that the water be removed in order to carry out polymerization. Formation of the pyrrolidone anion results in an electron distribution which is nucleophilic. In order for chain propagation to take place, the nucleophilic ion attaches to a pyrrolidone ring which has been activated by an activator molecule thereby causing a weak bond in the ring between the nitrogen and carbonyl group and causing the ring to open, forming a newly activated position and an anion on the polymer chain. A proton (hydrogen ion) from a 2-pyrrolidone molecule transfers to the chain anion resulting in an amide linkage and the regeneration of a nucleophilic pyrrolidone anion to further catalyze the reaction. The catalyst is continuously consumed and regenerated throughout the entire reaction by the transfer of a proton (hydrogen ion) giving rise to the formation of the pyrrolidone anion. It is believed that an activator initiates polymerization by displacing the hydrogen on the nitrogen atom of the pyrrolidone ring, thereby causing an electrophilic state within the 2-pyrrolidone molecule such that the bond between the nitrogen atom and the carbonyl group of the molecule is broken when such molecule is attacked by a pyrrolidone anion, thereby forming a straight chain. Such chain is attached to a pyrrolidone ring by bonding to the nitrogen atom therein and the ring structure is in turn opened by the attack of a nucleophilic pyrrolidone ion formed by the transfer of a proton from a 2-pyrrolidone molecule to a chain nitrogen. Irrespective of whether or not the above theory is correct, the use of nitrogen dioxide or the organic nitrite activators defined herein, in the polymerization of 2-pyrrolidone, has produced unexpectedly good results.

Generally, in carrying out a polymerization reaction according to the present invention, the monomer, catalyst and activator are placed in a polymerization vessel and subjected to polymerization temperatures, as hereinabove defined. However, the steps necessary to obtain complete polymerization will vary, depending upon the type of catalyst which is employed. For example, many of the catalysts, such as sodium hydroxide, cause the formation of water during the polymerization reaction. The presence of such water has a deleterious effect upon the polymerization reaction, namely, it hinders further polymerization and even brings the same to a halt in many instances. Accordingly, in order to achieve the desired results, it is necessary to remove such water of reaction from the reaction medium. This can easily be accomplished by a simple vacuum distillation. Therefore, when employing a catalyst, such as sodium hydroxide, the 2-pyrrolidone is placed in the polymerization vessel and the catalyst added thereto and the polymerization reaction started. The water formed is removed by vacuum distillation. If desired, the reaction mixture may be stirred during distillation which results in more rapid removal of the water of reaction. When all of the water in the reaction vessel has been completely removed, the activator is then added to the reaction mixture and the reaction is continued. Where a catalyst-activator system containing an alkali hydride as catalyst is employed, all of the reactants may be added to the polymerization vessel simultaneously and thereafter the reaction is carried through to completion. An advantage in the use of sodium hydride is that the step of removing water is eliminated, since water is not formed but rather gaseous hydrogen.

The instant method for polymerizing 2-pyrrolidone may be carried out by either solution, emulsion, suspension or bulk polymerization techniques. The solution and emulsion polymerizations may be either batch or continuous. When solution polymerization is employed, the 2-pyrrolidone is dissolved in a solvent, such as 1,4-dioxane, the desired catalyst activator is added to the solution and the polymerization carried out under the proper conditions. When emulsion or suspension polymerization is employed, the 2-pyrrolidone containing a catalyst is dispersed in a non-solvent therefor, such as petroleum ether, containing an emulsifying agent. Subsequently, the desired activator is added to the dispersion and the reaction mixture is subjected to polymerization conditions. A suitable coagulant is then added to the polymerization mixture in order to precipitate the polymer. A suitable emulsifying agent which may be employed is sodium lauryl sulfate and a suitable coagulant is phosphoric acid.

The polypyrrolidone described herein is particularly adapted for use in the manufacture of shaped articles such as filaments, fibers, films, and the like, as well as in the manufacture of molded articles. Lower molecular weight polypyrrolidone prepared in the same manner may be used in the preparation of coatings and lacquers. In preparing fibers from polypyrrolidone, various well-known methods may be employed, such as the melt-spinning, dry-spinning and wet-spinning methods. When using the wet-spinning method, the polypyrrolidone is dissolved in a suitable solvent and subsequently spun from the solution into a coagulating medium to form the fibers or filaments. Where the dry-spinning method is employed, the polypyrrolidone is dissolved in a suitable solvent and extruded into a heated atmosphere in order to remove the solvent from the polymer. In the melt-spinning method, the polymer is melted and spun into a heated atmosphere to precipitate the filaments.

Polypyrrolidone, produced in accordance with the present process, may have various agents incorporated therein in order to vary and add to its properties, such as plasticizers, pigments, dyes, anti-static agents, fire-retarding agents, and the like, etc.

In order to more fully illustrate the invention, the following specific examples are given, it being understood that the invention is not to be limited thereby but only insofar as the same may be limited by the appended claims. In the examples, all parts and percents are by weight unless otherwise indicated.

*Example I*

The following example is illustrative of the polymerization carried out in the absence of a nitrite or nitrogen dioxide activator. To a 50 gram sample (0.589 mole) of 2-pyrrolidone, there was added 0.5 gram (0.0208 mole) of sodium hydride while flushing the reaction vessel with dry nitrogen. The reaction mixture was allowed to stand at 25° C. There was no evidence of any polymer formation after 15 minutes and only a trace of polymer was noted after a half hour. After 2 hours the mixture was a thin mush. After an additional 2 hours the polymer formed was recovered by washing with water and filtering. The polymer was further washed with acetone and air-dried. There was a yield of 0.25 gram or 0.5 percent of polymer.

*Example II*

To a 50 gram sample (0.589 mole) of monomeric pyrrolidone, there was added 0.5 gram (0.0208 mole) of sodium hydride and 0.607 gram (0.00589 mole) of n-butyl nitrite. The reaction mixture became semi-solid after several minutes. It was permitted to stand at 25°

C. for 4 hours and became a hard cake. The cake was ground up to a moderately fine powder and washed with water. After further washing with acetone, the polymer was air-dried. There was a yield of polymer of 7 grams or 14 percent in comparison with a 0.5 percent yield in Example I wherein a catalyst activator was not employed.

*Example III*

To a 50 gram sample (0.589 mole) of 2-pyrrolidone, there was added 0.5 gram (0.0208 mole) of sodium hydride and 125 ml. (0.00557 mole) of nitrogen dioxide. In order to introduce the desired amount of nitrogen dioxide into the reaction mixture conveniently, it was first permitted to displace dry nitrogen from a 125 ml. flask and subsequently poured into the reaction vessel, whereupon it was quickly absorbed by the reaction mixture. The reaction mixture became semi-solid after several minutes. It was permitted to stand at 25° C. for 4 hours and became a hard cake. The cake was ground up to a moderately fine powder and washed with water. After further washing with acetone, the polymer was air-dried. There was a yield of polymer of 3 grams or 6 percent in comparison with a 0.5 percent yield in Example I wherein no catalyst activator was employed.

As may be seen from the above examples, the catalyst-activator system of the present invention will considerably speed up the polymerization reaction and result in greatly increased yields of polymer. When like samples of 2-pyrrolidone are polymerized in the presence of hydroxides, oxides and pyrrolidone salts of the alkali metals and other activators such as 2,2,2-trichloroethyl nitrite, 2-nitroethyl nitrite, 2-methylbenzyl nitrite, 2-methoxyethyl nitrite and the like, similar beneficial results are obtained.

The instant method of polymerizing 2-pyrrolidone and the new catalyst-activator systems of this invention exhibit many advantages over the prior art. Nitrogen dioxide, for example, being a gas at ordinary temperatures and pressures, can be added to the reaction mixture in this form, thereby permitting an excellent distribution of the activator throughout the reaction mixture. Furthermore, nitrogen dioxide or the organic nitrites permit the addition of a different type of end group to the polypyrrolidone, thereby resulting in better dyeability and solubility of the polymer. The use of nitrogen dioxide or the organic nitrites as catalyst or polymerization activators decreases materially the amount of time to carry the reaction to completion and substantially increases the yield of polymer. The activator compounds of this invention are also readily available and inexpensive. Numerous other advantages will be apparent to those skilled in the art.

As many apparently widely different embodiments of this invention may be made without departing from the spirit and scope thereof, it is to be understood that the same is not to be limited to the specific embodiments thereof except as defined in the appended claims.

We claim:

1. A process for polymerizing 2-pyrrolidone which comprises forming a mixture containing 2-pyrrolidone, a catalyst selected from the group consisting of alkali metals, pyrrolidone salts of alkali metals, hydrides of alkali metals, alkyl and aryl salts of alkali metals, hydroxides and oxides of alkali metals, and a catalyst activator selected from the group consisting of nitrogen dioxide and organic nitrites having the general formula:

$$R-O-N=O$$

wherein R is selected from the group consisting of alkyl radicals containing 1 to 10 carbon atoms, haloalkyl radicals containing 2 to 10 carbon atoms, nitroalkyl radicals containing 2 to 10 carbon atoms, aralkyl radicals containing 7 to 10 carbon atoms, and alkoxyalkyl radicals containing 3 to 12 carbon atoms, the molar ratio of activator to catalyst being in the range of 1:1.1 to 1:200 and the molar ratio of catalyst to 2-pyrrolidone being in the range of 1:5 to 1:280, and subjecting said mixture to a temperature in the range of −70° C. to 100° C. until polymerization is complete.

2. The process as defined in claim 1 wherein the catalyst activator is nitrogen dioxide.

3. The process as defined in claim 1 wherein the catalyst activator is n-butyl nitrite.

4. The process as defined in claim 1 wherein the catalyst activator is 2,2,2-trichloroethyl nitrite.

5. The process as defined in claim 1 wherein the catalyst activator is 2-nitroethyl nitrite.

6. The process as defined in claim 1 wherein the catalyst activator is 2-methylbenzyl nitrite.

7. The process as defined in claim 1 wherein the catalyst is sodium hydride.

8. The process as defined in claim 1 wherein the catalyst is sodium hydroxide.

9. The process as defined in claim 1 wherein the catalyst is sodium pyrrolidone.

10. The process as defined in claim 1 wherein the catalyst is sodium phenyl.

11. The process as defined in claim 1 wherein the catalyst is potassium hydroxide.

12. The process as defined in claim 1 wherein any water which is formed during the reaction is completely removed by vacuum distillation before the addition of the catalyst activator.

13. A process for polymerizing 2-pyrrolidone which comprises forming a mixture containing 2-pyrrolidone, a catalyst selected from the group consisting of alkali metals, pyrrolidone salts of alkali metals, hydrides of alkali metals, alkyl and aryl salts of alkali metals, hydroxides and oxides of alkali metals, and a catalyst activator selected from the group consisting of nitrogen dioxide and organic nitrites having the general formula:

$$R-O-N=O$$

wherein R is selected from the group consisting of alkyl radicals containing 1 to 10 carbon atoms, haloalkyl radicals containing 2 to 10 carbon atoms, nitroalkyl radicals containing 2 to 10 carbon atoms, aralkyl radicals containing 7 to 10 carbon atoms, and alkoxyalkyl radicals containing 3 to 12 carbon atoms, the molar ratio of activator to catalyst being in the range of 1:1.1 to 1:200 and the molar ratio of catalyst to 2-pyrrolidone being in the range of 1:5 to 1:280, and subjecting said mixture to a temperature in the range of 20° C. to 70° C. until polymerization is complete.

14. The process as defined in claim 13 wherein any water which is formed during the reaction is completely removed by vacuum distillation before the addition of the catalyst activator.

15. The process as defined in claim 13 wherein the catalyst activator is nitrogen dioxide.

16. The process as defined in claim 13 wherein the catalyst activator is n-butyl nitrite.

17. The process as defined in claim 13 wherein the catalyst is sodium hydride.

18. The process as defined in claim 13 wherein the catalyst is sodium hydroxide.

19. A process for polymerizing 2-pyrrolidone which comprises forming a mixture containing 2-pyrrolidone and sodium hydroxide, the molar ratio of sodium hydroxide to 2-pyrrolidone being in the range of 1:5 to 1:280, reacting said mixture by subjecting the same to a temperature in the range of 20° C. to 70° C., removing the water which is formed during the reaction by vacuum distillation, adding n-butyl nitrite to the reaction mixture, the molar ratio of n-butyl nitrite to sodium hydroxide being in the range of 1:1.1 to 1:200, and thereafter maintaining the reaction mixture at a temperature in the range of 20° C. to 70° C. until polymerization is complete.

20. A process for polymerizing 2-pyrrolidone comprising forming a mixture containing 0.00557 mole of nitrogen dioxide, 0.589 mole of 2-pyrrolidone and 0.0208 mole of sodium hydride and subjecting the mixture to a temperature of 25° C. until polymerization is complete.

21. A process for polymerizing 2-pyrrolidone which comprises forming a mixture containing 2-pyrrolidone, a catalytic amount of an alkali metal salt of 2-pyrrolidone as a catalyst for polymerization and nitrogen dioxide as a catalyst activator, and allowing said mixture to stand until polymerization is complete, the mixture of said three components as initially formed containing an excess of catalyst over catalyst activator.

No references cited.